United States Patent
Lee et al.

(10) Patent No.: US 8,652,662 B2
(45) Date of Patent: Feb. 18, 2014

(54) BATTERY PACK AND METHOD OF FABRICATING THE SAME

(75) Inventors: Sangjoo Lee, Yongin-si (KR); Sangjin Park, Yongin-si (KR); Jongwook Yoon, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 389 days.

(21) Appl. No.: 12/830,262

(22) Filed: Jul. 2, 2010

(65) Prior Publication Data

US 2011/0003181 A1    Jan. 6, 2011

(30) Foreign Application Priority Data

Jul. 3, 2009    (KR) .................. 10-2009-0060860

(51) Int. Cl.
*H01M 16/00*    (2006.01)

(52) U.S. Cl.
USPC ............................................................ 429/7

(58) Field of Classification Search
USPC ............................................................ 429/7
See application file for complete search history.

(56) References Cited

U.S. PATENT DOCUMENTS

| 2005/0089753 A1 | 4/2005 | Yoon |
| 2009/0111004 A1 | 4/2009 | Jang et al. |
| 2011/0045322 A1* | 2/2011 | Baek et al. .................. 429/7 |

FOREIGN PATENT DOCUMENTS

| JP | 2005-044669 A | 2/2005 |
| KR | 10-2005-0039387 | 4/2005 |
| KR | 10-2007-0109081 | 11/2007 |
| KR | 10-2009-0043381 A | 5/2009 |

OTHER PUBLICATIONS

Korean Notice of Allowance dated Jul. 13, 2011 in Application No. 10-2009-0060860.

* cited by examiner

*Primary Examiner* — Ula C Ruddock
*Assistant Examiner* — Frank Chernow
(74) *Attorney, Agent, or Firm* — Knobbe, Martens, Olson & Bear, LLP

(57) ABSTRACT

A battery pack comprising a battery cell coupled to a circuit module and a method of fabricating the same are disclosed. A battery pack comprises a battery cell, a circuit module coupled to the battery cell, wherein the circuit module comprises a top surface, a bottom surface, and terminals on the top surface, a lead plate comprising an extension region extending from the bottom surface of the circuit module to a top region of the battery cell to couple the battery cell to the circuit module, and a cover coupled to the circuit module and the battery cell to expose the terminals to an exterior. The lead plate includes at least a first rib protruding upward from the extension region that contacts a top surface of the battery cell.

8 Claims, 10 Drawing Sheets

BATTERY PACK AND METHOD OF FABRICATING THE SAME

CROSS-REFERENCE TO RELATED APPLICATION

This application claims priority to and the benefit of Korean Patent Application No. 10-2009-0060860, filed on Jul. 3, 2009, the entire content of which is incorporated herein by reference.

BACKGROUND

1. Field

The present disclosure relates to a battery pack and a method of fabricating the same.

2. Description of the Related Technology

In general, as portable electronic devices such as video cameras, mobile telephones, and portable computers are light and exhibit high performance, research is being directed at the use of a secondary battery as a driving power source for such portable electronic devices. For example, a nickel-cadmium battery, a nickel-hydrogen battery, a nickel-zinc battery, and a lithium ion battery can be used as a secondary battery. Among the above batteries, the lithium ion battery can be rechargeable and have a small size but large capacity. Due to the advantages that a driving voltage and energy density per unit weight are high, the lithium ion battery is widely used for the field of up-to-date electronic devices.

The lithium ion battery may be fabricated into a battery pack. The battery pack includes a battery cell including an electrode assembly having a positive electrode plate, a negative electrode plate, and a separator, a can accommodating the electrode assembly, and a cap assembly sealing the can, a circuit module having a protective circuit device and coupled to the battery cell, and a cover covering the circuit module.

SUMMARY

Embodiments of the present invention provides a battery pack in which a battery cell and a circuit module are fixed during welding so that welding may be performed in a correct position and a method of fabricating the same.

In accordance with an aspect of the present invention, a battery pack comprises a battery cell; a circuit module coupled to the battery cell, wherein the circuit module comprises a top surface, a bottom surface, and terminals on the top surface; a lead plate comprising an extension region extending from the bottom surface of the circuit module to a top of the battery cell to couple the battery cell to the circuit module; and a cover coupled to the circuit module and the battery cell to expose the terminals to an exterior, wherein the lead plate includes at least a first rib protruding upward from an extension region that contacts a top surface of the battery cell.

The rib may be bent toward an exterior of the lead plate.

A bending surface of the rib may be parallel to the top surface of the battery cell.

The rib may be positioned at an end of the extension region and be outwardly bent in a longitudinal direction of the battery cell.

The lead plate may include a pair of ribs positioned on opposing sides of the extension region and be outwardly bent in a width direction of the battery cell.

The rib may be continuously formed along the circumference of the extension region and be outwardly bent.

The rib may protrude from a top surface of the extension region at an angle.

The rib may perpendicularly protrude from the top surface of the extension region.

The lead plate may include a plurality of ribs protruding from the top surface of the extension region to have the same height.

An inner region of the extension region may be welded onto the battery cell.

The lead plate may comprise a bottom region formed under the circuit module; a side wall region bent downward from the bottom region; and an extended region extending from the side wall region to be coupled to the battery cell.

The bottom region may be electrically coupled to a wiring line pattern of the circuit module to be electrically coupled to a negative electrode terminal of the circuit module.

In accordance with another aspect of the present invention, a method of fabricating a battery pack comprises contacting a lead plate formed under a circuit module with a top surface of a battery cell; pressing a rib perpendicularly protruding above the lead plate to the top surface of the battery; performing welding inside the rib; and coupling a cover onto the battery cell and the circuit module.

The welding may comprise pressing the rib to a bottom surface of a welding jig, wherein the lead plate and the battery cell are fixed.

The welding may comprise coupling a fixing protrusion protruding from a welding jig to a welding hole formed in a center region of a top surface of the circuit module to couple the battery cell to the circuit module.

The welding may be performed when the lead plate is exposed to a welding hole formed on a bottom surface of a welding jig.

The welding may be performed by laser welding or resistance welding.

In accordance with still another aspect of the present invention, a method of fabricating a battery pack comprises welding a lead plate, wherein welding comprises contacting the lead plate formed under a circuit module with a top surface of a battery cell, pressing a top surface of the lead plate with a rib protruding downward from a bottom surface of a welding jig, and performing welding inside the rib; and coupling a cover to a top surface of the battery cell and a top surface of the circuit module.

The welding may comprise exposing the lead plate to a welding hole formed inside the rib.

The method may further comprise covering side surfaces of the battery cell with a label after coupling the cover.

In the battery pack and the method of fabricating the same according to aspects of the present invention, the ribs protrude upward from opposing ends of the lead plate such that a welding jig may press the rib during welding to couple the battery cell to the circuit module during welding, such that welding may be performed in correct positions.

BRIEF DESCRIPTION OF THE DRAWINGS

Embodiments of the present invention will be more apparent from the following detailed description in conjunction with the accompanying drawings, in which.

DETAILED DESCRIPTION

Figure 1:
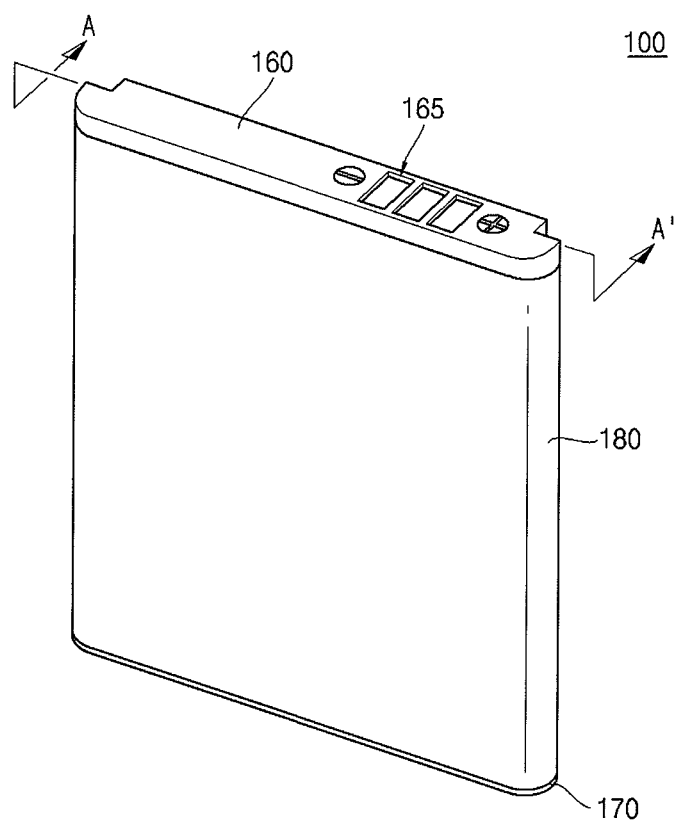
FIG. 1 is a perspective view illustrating a battery pack according to an embodiment of the present invention.

Embodiments of the present invention will be described in detail with reference to the accompanying drawings. The same reference numerals are assigned to the same elements throughout the drawings. Hereinafter, differences among the embodiments will be described.

Hereinafter, the structure of a battery pack according to an embodiment of the present invention will be described.

Figure 2:
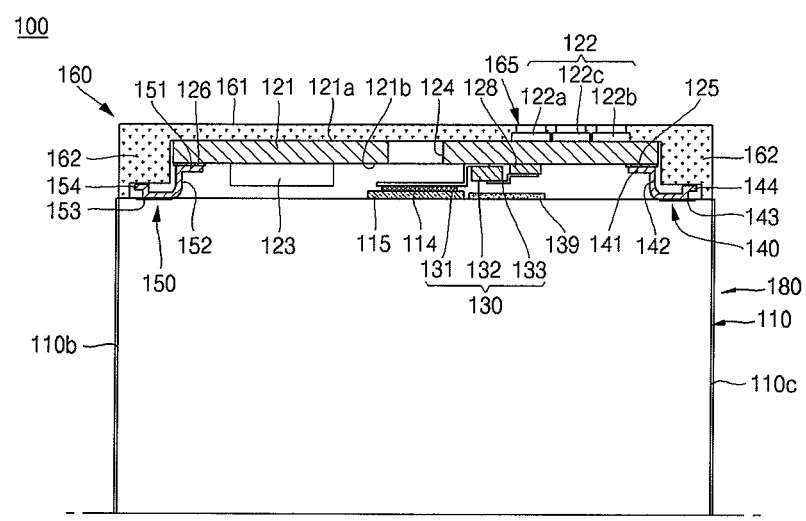
FIG. 2 is a sectional view taken along the line A-A' of FIG. 1.
Figure 3:
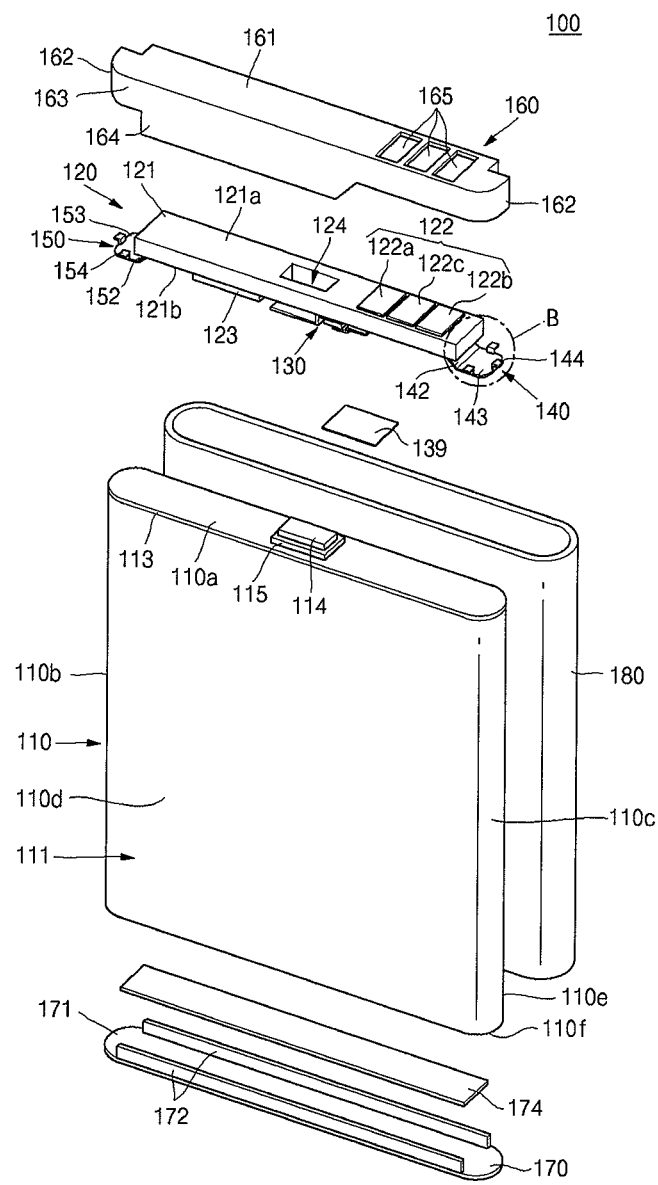
FIG. 3 is an exploded perspective view illustrating the battery pack according to the embodiment of the present invention.
Figure 4:
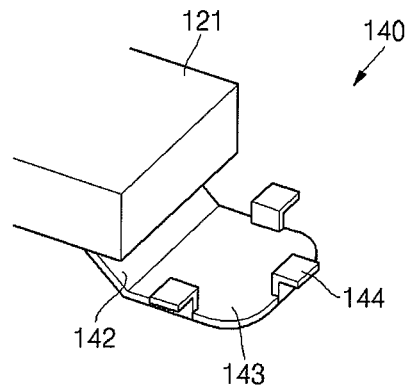
FIG. 4 is a perspective view illustrating a lead plate obtained by enlarging a portion B of FIG. 3.

FIG. 1 is a perspective view illustrating a battery pack according to an embodiment of the present invention. FIG. 2 is a sectional view taken along the line A-A' of FIG. 1. FIG. 3 is an exploded perspective view illustrating the battery pack according to an embodiment of the present invention. FIG. 4 is a perspective view illustrating a lead plate obtained by enlarging a portion B of FIG. 3.

Referring to FIGS. 1 to 4, a battery pack 100 according to an embodiment of the present invention includes a battery cell 110, a circuit module 120, a positive temperature coefficient (PTC) assembly 130, a first lead plate 140, a second lead plate 150, a top cover 160, a bottom cover 170, and a label 180.

The battery cell 110 may include: an electrode assembly (not shown) that may be charged and discharged and may have a positive electrode, a negative electrode, and a separator interposed between the positive electrode and the negative electrode; a can 111 in the form of a container made of a metal material to accommodate the electrode assembly and an electrolyte (not shown); and a cap plate 113 sealing the can 111. According to an embodiment, the cap plate 113 is made of metal. An electrode terminal 114 may be coupled approximately to the center of the cap plate 113. An insulating gasket 115 may be interposed between the cap plate 113 and the electrode terminal 114 to insulate the electrode terminal 114 from the cap plate 113.

The can 111 and the cap plate 113 may serve as terminals. According to an embodiment of the present invention, the can 111 and the cap plate 113 serve as a positive electrode. In this embodiment, the electrode terminal 114 serves as a negative electrode. That is, the can 111 and the cap plate 113 have a positive polarity and the electrode terminal 114 has a negative polarity, or vice versa.

The battery cell 110 may include a top surface 110a from which the electrode terminal 114 protrudes and is insulated by the gasket 115, a pair of narrow side surfaces 110b and 110c and a pair of wide side surfaces 110b and 110e coupled with the top surface 110a, and a bottom surface 110f coupled with the side surfaces 110b, 110c, 110d, and 110e to face the top surface 110a. Among the side surfaces 110b, 110c, 110d, and 110e coupled with the top surface 110a of the battery cell 110, the short side surfaces 110b and 110c are side surfaces with a narrow width, and the wide side surfaces 110d and 110e are side surfaces with a wide width.

The circuit module 120 may be disposed on the battery cell 110 to be electrically coupled to the battery cell 110 and may include a circuit board 121, terminals 122, a circuit element 123, a welding hole 124, and terminal patterns 125 and 126.

The circuit board 121 may be made with approximately the shape of a plate and may include a protective circuit preventing overcharge, overdischarge, and overcurrent of the battery cell 110. According to the illustrated embodiment, the top surface 121a of the circuit board 121 is the same as the top surface of a circuit module 120, and the bottom surface 121b of the circuit board 121 is the same as the circuit module 120.

The terminals 122 may be formed on the top surface 121a of the circuit board 121 and can electrically couple the circuit board 121 to an external electronic device (not shown). For example, the terminal 122 may include a pack minus terminal 122a, a pack plus terminal 122b, and a temperature and ID checking terminal 122c.

The circuit element 123 may be mounted on the bottom surface 121b of the circuit board 121 and can form the protective circuit preventing the above-described overcharge, overdischarge, and overcurrent.

The welding hole 124 may be formed approximately in the center of the circuit board 121 to pass through the top surface 121a and the bottom surface 121b. The welding hole 124 may be positioned in the region corresponding to the electrode terminal 114 of the battery cell 110 and provide a welding space when the PTC assembly 130 to be described later is welded to the electrode terminal 114 by resistance or laser welding.

The terminal patterns 125 and 126 may be formed on the bottom surface 121b of the circuit board 121. The first lead plate 140 to be described later may be welded to the terminal pattern 125. The second lead plate 150 to be described later may be welded to the terminal pattern 126. In addition, the PTC assembly 130 to be described later may be welded to the terminal pattern 128.

The PTC assembly 130 may be installed on the bottom surface 121b of the circuit board 121 to be electrically coupled to the terminal pattern 128 of the circuit module 120 and to be electrically coupled to the electrode terminal 114 by resistance welding performed through the welding hole 124. In more detail, the PTC assembly 130 can include an electrode lead plate 131, a PTC device 132, and a coupling lead plate 133. The electrode lead plate 131 may be welded directly to the electrode terminal 114. The electrode lead plate 131 may be made of, for example, nickel or a nickel alloy. The PTC device 132 may be coupled to the electrode lead plate 131. The coupling lead plate 133 may be coupled to the PTC device 132. The coupling lead plate 133 may be resistance or laser welded to the terminal pattern 128 formed on the circuit board 121. An insulating sheet 139 may be disposed between the PTC assembly 130 and the battery cell 110 to prevent electric short between the PTC assembly 130 and the cap plate 113.

The first lead plate 140 may be coupled to one side (the right side of FIG. 2) of the circuit module 120 to be electrically coupled to the terminal pattern 125 of the circuit module 120. That is, the first lead plate 140 can electrically couple the battery cell 110 to the circuit module 120. The first lead plate 140 may be made of a metal such as nickel or a nickel alloy. The first lead plate 140 may be coupled to the top surface 110a (that is, the cap plate 113 serving as a positive electrode) of the battery cell 110 and may serve as the positive electrode.

Specifically, the first lead plate 140 may include a first bottom region 141, a first side wall region 142, a first extension region 143, and first ribs 144.

The plate-shaped first bottom region 141 may contact the bottom surface 121b of the circuit board 121 and be electrically coupled to the circuit module 120 by laser welding.

The first side wall region 142 may be bent at and extend from the first bottom region 141 toward the top surface 110a of the battery cell 110, and can secure a distance between the circuit module 120 and the battery cell 110.

The first extension region 143 may be bent at and extend from the first side wall region 142 to contact the top surface 110a of the battery cell 110 and run approximately parallel to the first bottom region 141. The first extension region 143 may be electrically coupled to the top surface 110a of the battery cell 110 by resistance welding or laser welding. In order to improve resistance to falling impact applied to the battery pack, silicon bonding may be additionally performed between the first bottom region 141 and the battery cell 110.

The first ribs 144 may protrude upward from the first extension region 143. The first rib 144 may be formed on the three sides of the first extension region 143 so as to be perpendicular to the top surface of the first extension region 143. One of the first ribs 144 may be formed on the end of the first extension region 143, and two of the first ribs 144 may be formed on the side walls to be parallel to the longitudinal direction of the battery cell 110. The tops of the first ribs 144 may be bent toward the outside of the first extension region 143. The bending parts of the first ribs 144 may form planes parallel to the first extension region 143. As described later, the first ribs 144 are parts on which a welding jig may be placed when welding is performed to couple the battery cell 110 with the circuit module 120. The welding jig can press the first ribs 144 from above to easily fix a position of the circuit module 120.

The second lead plate 150 may be coupled to the other side (the left side of FIG. 2) of the circuit module 120. The second lead plate 150 can keep the circuit module 120 disposed on the battery cell 110 with the first lead plate 140 being kept disposed horizontally. The second lead plate 150 may be electrically coupled to the terminal pattern 126 of the circuit module 120. The terminal pattern 126 may be electrically coupled by a positive electrode wiring line pattern (not shown) of the circuit module 120. The second lead plate 150 may not be electrically coupled to the positive electrode wiring line pattern of the circuit module 120.

The second lead plate 150 may have the same shape and size as those of the first lead plate 140 and may be made of the same material as that of the first lead plate 140. The second lead plate 150 may include a second bottom region 151, a second side wall region 152, a second extension region 153, and second ribs 154. Since the second bottom region 151, the second side wall region 152, and the second extension region 153 of the second lead plate 150 correspond to the first bottom region 141, the first side wall region 142, and the first extension region 143 of the first lead plate 140, detailed description thereof will be omitted.

According to another embodiment, the second ribs 154 may protrude upward from the second extension region 153. The second ribs 154 may be formed on the three sides of the second extension region 153 to be perpendicular to the top surface of the second extension region 153. The tops of the second ribs 154 may be bent toward the outside of the second extension region 153. The bending parts of the second ribs 154 can form planes having the same height as that of the first ribs 144 of the first plate 140. Therefore, when the welding jig presses the second ribs 154, the same pressure as is applied to the first ribs 144 of the first plate 140 may be applied to the second ribs 154 to support the welding jig so that the battery cell 110 and the circuit module 120 may be precisely fixed.

The top cover 160 may be coupled to the top of the battery cell 110 and can accommodate the circuit module 120 therein. The top cover 160 may include a cover plate 161 and side walls 164 extending from the cover plate 161 toward the circuit module 120.

The cover plate 161 may have a similar shape to that of the top surface 110a of the battery cell 110. The inner surface of the cover plate 161 can contact the top surface 121b of the circuit board 121. The cover plate 161 can have through-holes 165 formed in the regions corresponding to the terminals 122. The through-holes 165 may expose the terminals 122 to the outside such that the battery pack 100 according to the embodiment of the present invention and an external electronic device (not shown) may be electrically coupled to each other.

The side walls 164 can include both ends 162 positioned at both longitudinal ends of the cover 160 and a coupling portion 163 coupling the both ends 162 to each other. The ends 162 may contact the regions corresponding to the narrow side surfaces 110b and 110c in the top surface 110a of the battery cell 110 and support the cover plate 161. The coupling portion 163 may further extend toward the circuit module 120 than the ends 162. A portion of the coupling unit 163 that covers the tops of the pair of wide side surfaces 110d and 110e of the battery cell 110 may be surrounded by the label 180, as will be described later.

The bottom cover 170 may be coupled to the lower side of the battery cell 110. The bottom cover 170 may include a bottom plate 171 and extensions 172 extending from the bottom plate 171 toward the battery cell 110.

The bottom plate 171 can have approximately the same shape as that of the bottom surface 110f of the battery cell 110 and may be attached to the bottom surface 110f of the battery cell 110 by an adhesive 174.

In addition, the extensions 172 may cover the lower sides of the wide side surfaces 110d and 110e of the battery cell 110. The extensions 172 may be surrounded by the label 180, as will be described later.

The label 180 may be attached to surround the side surfaces 110b, 110c, 110d, and 110e of the battery cell 110. The label 180 can cover a part of the coupling portion 163 of the cover 160 and the extensions 172 of the bottom cover 170.

As described above, the battery pack 100 according to an embodiment of the present invention can include the ribs 144 and 154 with bending tops, which protrude perpendicularly from both ends of the lead plates 140 and 150, so that the welding jig may press the ribs 144 and 154 during welding. Therefore, the battery cell and the circuit module may be fixed during welding so that the welding between the battery cell and the circuit module may be performed in correct positions.

Hereinafter, the structure of a battery pack according to another embodiment of the present invention will be described.

Figure 5:
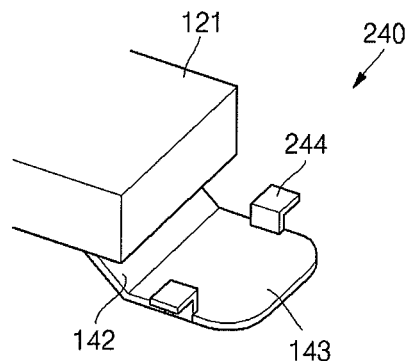
FIG. 5 is a perspective view illustrating a lead plate used in a battery pack according to another embodiment of the present invention.

FIG. 5 is a perspective view illustrating a lead plate used in a battery pack according to another embodiment of the present invention.

As illustrated in FIG. 5, a battery pack (not shown) according to another embodiment of the present invention can include a first lead plate 240 extended from the bottom of a circuit board 121.

The first lead plate 240 can include first ribs 244 formed in a first extension region 143.

The first ribs 244 protrude from the two sides of the first extension region 143, which run parallel to the longitudinal direction of the battery cell 110. As in the above-described embodiment, the first ribs 244 may protrude perpendicularly from the first extension region 143 and the tops of the first ribs 244 may be bent toward the outside in the width direction of the battery cell 110. The number of first ribs 244 may be reduced in comparison with the above-described embodiment so that manufacturing costs may be reduced. Since the first ribs 244 are positioned to correspond to both sides of the first extension region 143, the welding jig that presses the first ribs 244 from above may be balanced.

Moreover, although not illustrated, a second lead plate may be formed on the other side of the circuit board 121 to have a shape corresponding to the shape of the first lead plate 240. In this case, the second ribs of the second lead plate may be formed to have the same shape and height as the shape and height of the first ribs 244.

Hereinafter, the structure of a battery pack according to still another embodiment of the present invention will be described.

Figure 6:
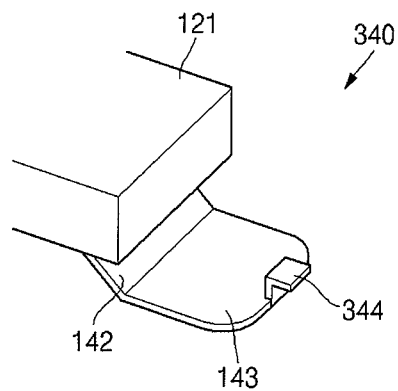
FIG. 6 is a perspective view illustrating a lead plate used in a battery pack according to still another embodiment of the present invention.

FIG. 6 is a perspective view illustrating a lead plate used in a battery pack according to still another embodiment of the present invention.

As illustrated in FIG. 6, the battery pack (not shown) according to still another embodiment of the present invention can include a first lead plate 340 extending from the bottom of a circuit board 121.

The first lead plate 340 can include a first rib 344 protruding from a first extension region 143.

The first rib 344 may be formed at the center of the end of the first extension region 143. In addition, the first rib 344 may protrude perpendicularly from the first region 143. The top of the first rib 344 may be bent in the longitudinal direction of the battery cell 110 to face the outside in the longitudinal direction of the battery cell 110. Although the number of first rib 344 may be reduced in comparison with the above-described embodiment, since the first rib 344 can be formed in the center of the end of the first extension region 143, the welding jig may be stably supported.

Although not illustrated, a second lead plate corresponding to the first lead plate 340 may be formed on the other side of the circuit board 121.

Hereinafter, the structure of a battery pack according to still another embodiment of the present invention will be described.

Figure 7:
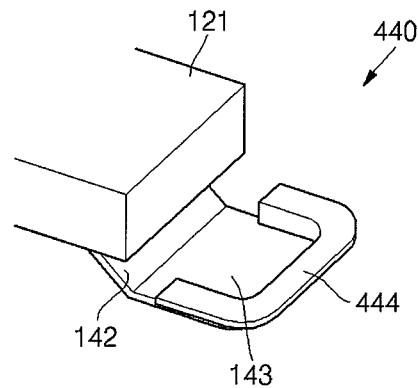
FIG. 7 is a perspective view illustrating a lead plate used in a battery pack according to still another embodiment of the present invention.

FIG. 7 is a perspective view illustrating a lead plate used in a battery pack according to still another embodiment of the present invention.

As illustrated in FIG. 7, the battery pack (not shown) according to still another embodiment of the present invention may include a first lead plate 440 extending from the bottom of a circuit board 121.

The first lead plate 440 may include a first rib 444 protruding from the first extension region 143.

The first rib 444 may be continuously formed on the circumference of the first extension region 143. The first rib 444 may be formed on the three sides of the first extension region 143 and protrude perpendicularly from the first extended region 143. The top of the first rib 444 may be bent to form a plane that faces the outside of the first extension region 143. Therefore, the pressing area of the first rib 444 may be increased so that the pressure of the welding jig may be stably supported.

In addition, although not illustrated, a second lead plate corresponding to the first lead plate 440 may be formed on the other side of the circuit board 121.

Hereinafter, the structure of a battery pack according to still another embodiment of the present invention will be described.

Figure 8:
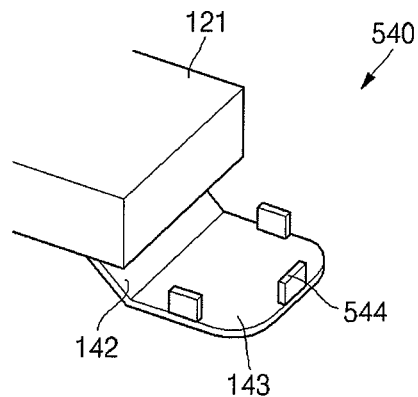
FIG. 8 is a perspective view illustrating a lead plate used in a battery pack according to still another embodiment of the present invention.

FIG. 8 is a perspective view illustrating a lead plate used in a battery pack according to still another embodiment of the present invention.

As illustrated in FIG. 8, the battery pack (not shown) according to still another embodiment of the present invention can include a first lead plate 540 extending from the bottom of a circuit board 121.

The first lead plate 540 can include first ribs 544 protruding from the first extension region 143.

The first ribs 544 may protrude perpendicularly from the three sides of the first extension region 143. Since the first ribs 544 may not be bent, the welding jig contacts the first ribs 544 to correspond to the width of the first ribs 544. The first ribs 544 may be selectively formed only at an end or on both sides of the first extension region 143. Since the first ribs 544 may easily support the welding jig and do not require a bending process, manufacturing costs may be reduced.

Although not illustrated, a second lead plate corresponding to the first lead plate 540 may be formed on the other side of the circuit board 121.

Hereinafter, the structure of a battery pack according to still another embodiment of the present invention will be described.

Figure 9:
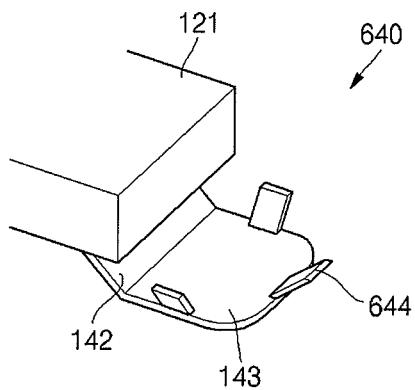
FIG. 9 is a perspective view illustrating a lead plate used in a battery pack according to still another embodiment of the present invention.

FIG. 9 is a perspective view illustrating a lead plate used in a battery pack according to still another embodiment of the present invention.

As illustrated in FIG. 9, the battery pack (not shown) according to still another embodiment of the present invention can include a first lead plate 640 extending from the bottom of a circuit board 121.

The first lead plate 640 includes first ribs 644 protruding from the first extension region 143.

The first ribs 644 may be formed on the three sides of the first extension region 143, respectively, and may protrude obliquely from the first extended region 143 at a preset angle. The first ribs 644 may have a shape in which the tops of the first ribs 644 are further opened than the part that contacts the first extension region 143. The first ribs 644 may be selectively formed only on an end or on both sides of the first extension region 143.

Therefore, the first ribs 644 can secure a larger welding area while supporting the welding jig so that welding may be easily performed.

In addition, although not illustrated, a second lead plate corresponding to the first lead plate 640 may be formed on the other side of the circuit board 121.

Hereinafter, a method of fabricating a battery pack according to an embodiment of the present invention will be described.

Figure 10:
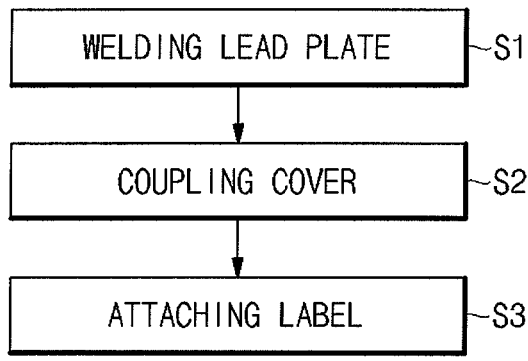
FIG. 10 is a flowchart illustrating a method of fabricating a battery pack according to an embodiment of the present invention.
Figure 11A:
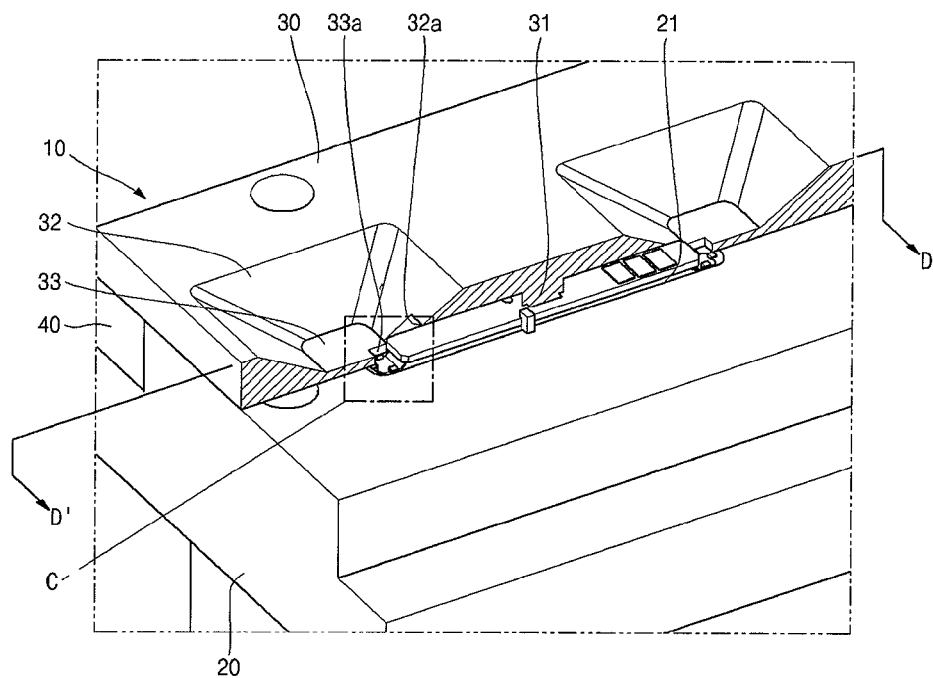
FIGS. 11A to 11E are views illustrating a method of fabricating a battery pack according to an embodiment of the present invention.
Figure 11B:
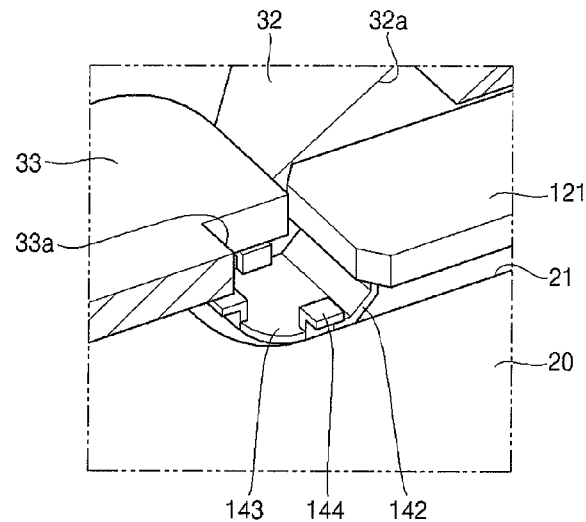
Figure 11C:
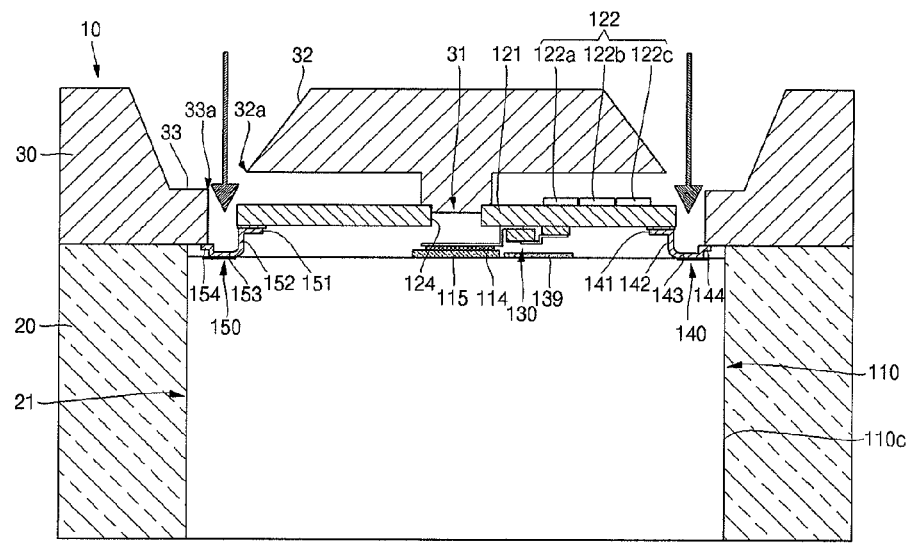

FIG. 10 is a flowchart illustrating a method of fabricating a battery pack according to an embodiment of the present invention. FIGS. 11A to 11E are views illustrating the method of fabricating a battery pack according to an embodiment of the present invention. Here, FIG. 11B is an enlarged partially sectional perspective view of a portion C of FIG. 11A and FIG. 11C is a sectional view taken along the line D-D' of FIG. 11A.

Referring to FIG. 10, the method of fabricating the battery pack 100 according to an embodiment of the present invention may be carried out by welding a lead plate (S1), coupling a cover (S2), and attaching a label (S3). Hereinafter, the steps S1, S2, and S3 of FIG. 10 will be described with reference to FIGS. 11A to 11E.

Referring to FIGS. 10, 11A to 11C, in the step of welding the lead plate (S1), a circuit module 120 may be welded onto a battery cell 110. In the step of welding the lead plate (S first, the circuit module 120 may be closely attached to the top surface of the battery cell 110. The first lead plate 140 and the second lead plate 150 of the circuit module 120 can contact both ends of the top surface of the battery cell 110, respectively.

At this time, the battery cell 110 and the circuit module 120 may be fixed between a bottom jig 20 and a top jig 30 of a welding jig 10. The bottom jig 20 can include an accommodating groove 21 therein to accommodate the battery cell 110 and to expose the top of the battery cell 110 and the circuit module 120 above the accommodating groove 21. The top jig 30 presses the circuit module from above the circuit module 120 to be coupled to the bottom jig 20.

The top jig 30 can include a fixing protrusion 31 that protrudes from the bottom surface thereof and couples the fixing protrusion 31 to a welding hole 124 of the circuit module 120 to fix a position of the circuit module 120. The top jig 30 can include an inclined surface 32 engraved from the top surface of the top jig 30 into the top jig 30 approximately in the form of an inverted pyramid and an approximately plane-shaped bottom surface 33 positioned at the position where the inclined surface 32 gathers.

The bottom surface 33 may contact ribs 144 and 154 of the lead plates 140 and 150 from above to press the ribs 144 and 154 under the load of a metal member 40 formed at both edges of the top jig 30. Therefore, the lead plates 140 and 150 may be correctly fixed to positions of the battery cell 110. Welding holes 33a corresponding to the extension regions 143 and 153 of the lead plates 140 and 150 may be formed on sides of the bottom surface 33. In addition, in order to facilitate easy welding, welding holes 32a may further be formed in parts of the inclined surface 32. Therefore, laser welding or resistance welding may be performed perpendicularly from above through the welding holes 33a.

Although not illustrated, after welding the lead plate (S1), welding of a PTC assembly 130 to an electrode terminal 114 of the battery cell 110 through the welding hole 124 of the circuit module 120 may further be performed.

Figure 11D:
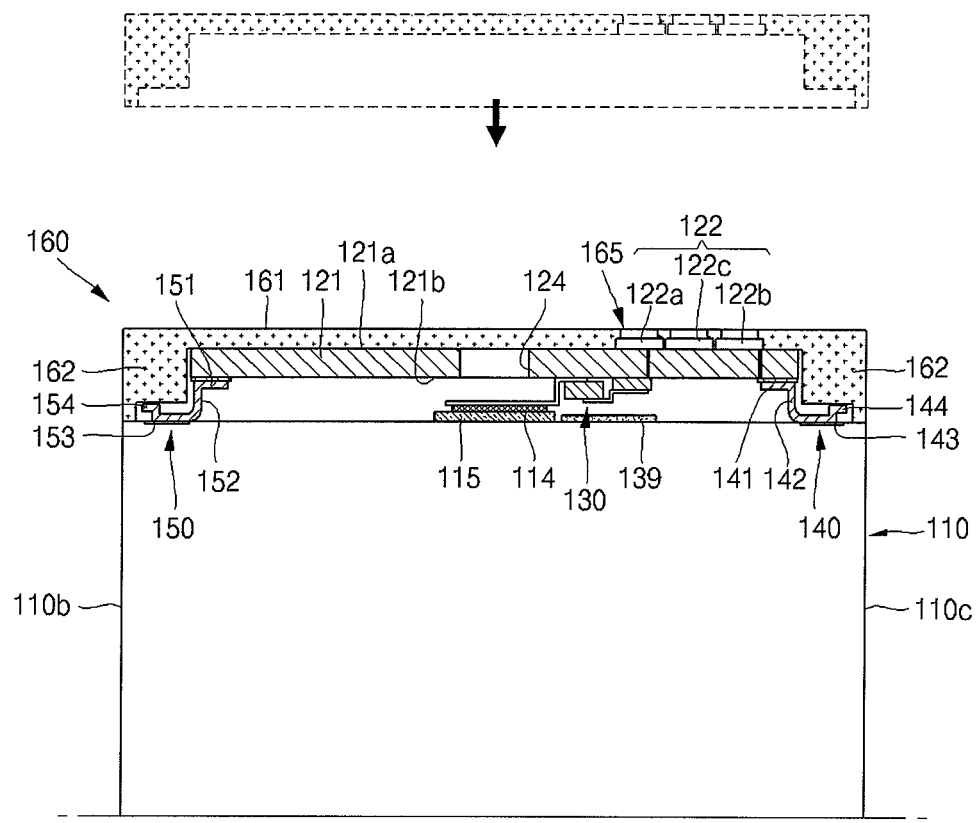

Referring to FIGS. 10 and 11D, in the step of coupling a cover (S2), a top cover 160 is inserted into the circuit module 120. In the step of coupling a cover (S2), the top surface and side surfaces of the circuit module 120 are all covered with the top cover 160 and the battery cell 110 is partially covered with the top cover 160. A plurality of through-holes 165 may be pre-formed in the top cover 160 such that terminals 122a, 122b, and 122c formed in the circuit module 120 are exposed to the outside. In addition to the top cover 160, a bottom cover (not shown) may be coupled to the bottom end of the battery cell 110 to absorb external shock.

Figure 11E:
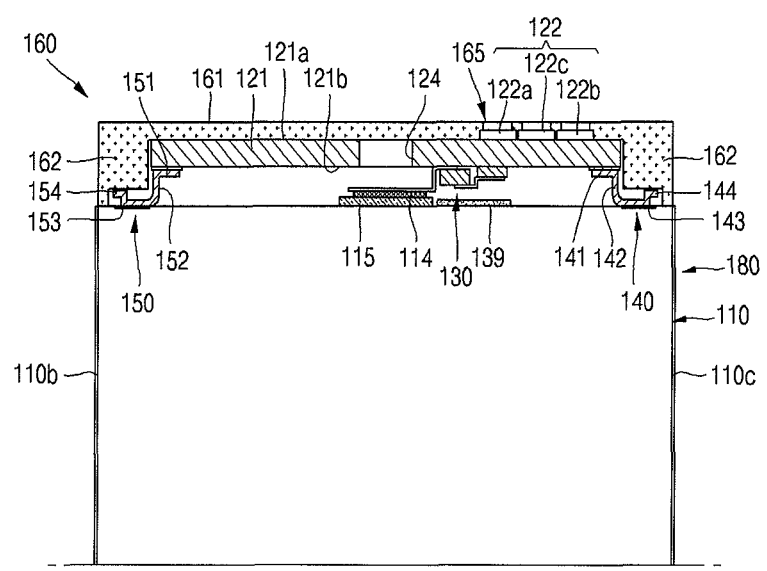

Referring to FIGS. 10 and 11E, in the step of attaching a label (S3), the side surfaces of the battery cell 110 are surrounded with a label 180. At this time, the top cover 160 and the bottom cover are partially covered with the label 180. The top cover 160 and the bottom cover are not separated from the battery cell 110 due to the label 180.

As described above, the battery pack 100 according to an embodiment of the present invention may be fabricated. As described above, since the bottom surface 33 of the welding jig 10 presses the ribs 144 and 154 of the lead plates 140 and 150 from above during welding to fix the ribs 144 and 154 onto the battery cell 110, the reliability of the battery pack 100 may be secured.

Hereinafter, another method of fabricating a battery pack according to another embodiment of the present invention will be described.

Figure 12A:
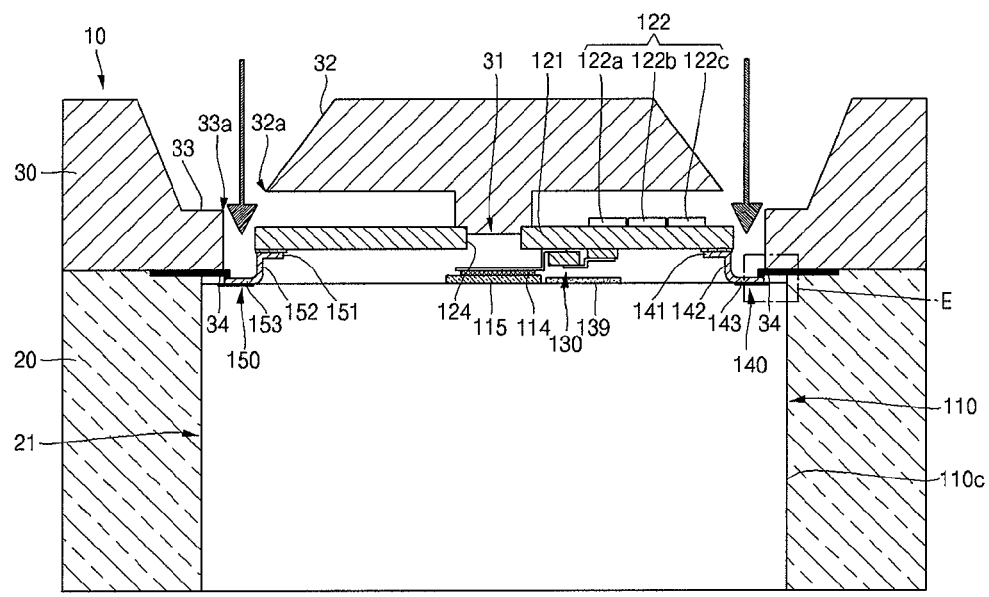
FIGS. 12A and 12B are views illustrating a method of fabricating a battery pack according to another embodiment of the present invention.
Figure 12B:
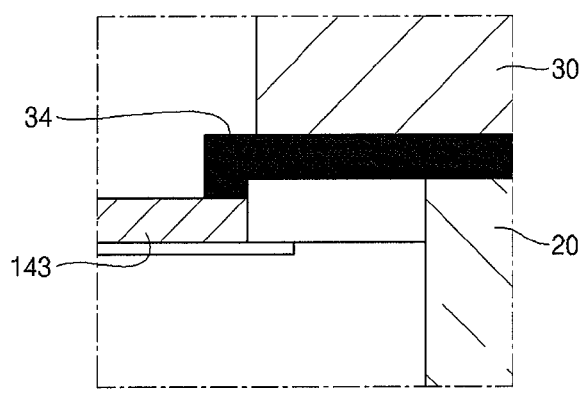

FIGS. 12A and 12B are views illustrating the method of fabricating a battery pack 100 according to another embodiment of the present invention. FIG. 12A is a sectional view illustrating welding of a lead plate (S1) in the method of fabricating a battery pack 100. FIG. 12B is an enlarged sectional view of a portion E of FIG. 12A.

Referring to FIGS. 12A and 12B, lead plates 140 and 150 of a circuit module 120 have no ribs formed thereon, but a top jig 30 of a welding jig 10 has ribs 34 formed on the bottom surface thereof. The ribs 34 may protrude from the bottom surface of the top jig 30 to fix extension regions 143 and 153 of the lead plates 140 and 150. Therefore, as in the above-described method of fabricating a battery pack, positions of the battery cell 110 and the circuit module 120 may be easily fixed during welding.

Although certain embodiments of the present invention have been described in detail hereinabove, it should be understood that many variations and modifications of the basic inventive concept herein described, which may appear to those skilled in the art, will still fall within the spirit and scope of embodiments of the present invention as defined by the appended claims.

What is claimed is:

1. A battery pack comprising:
a battery cell;
a circuit module coupled to the battery cell, wherein the circuit module comprises a top surface, a bottom surface, and terminals on the top surface;
a lead plate comprising an extension region, a side wall region and a bottom region wherein the lead plate extends from the bottom surface of the circuit module to a top region of the battery cell to couple the battery cell to the circuit module wherein the bottom region contacts the bottom surface of the circuit module, the extension region contacts the to region of the battery cell and extends longitudinally outward in a first direction and the side wall region spaces the extension region from the bottom surface of the circuit module a first distance; and
a cover coupled to the circuit module and the battery cell to expose the terminals to an exterior,
wherein the lead plate comprises a first rib protruding upward from the extension region that contacts a top surface of the battery cell wherein the first rib extends upward from the extension region a second distance less than the first distance and wherein the first rib extends outward in the first direction from the extension region and is positioned on the extension region so that the first rib is exposed from the circuit module in the first direction.

2. The battery pack of claim 1, wherein the rib is bent toward an exterior of the lead plate.

3. The battery pack of claim 2, wherein a bending surface of the rib runs parallel to the top surface of the battery cell.

4. The battery pack of claim 1, wherein the rib is positioned at an end of the extension region and is outwardly bent in a longitudinal direction of the battery cell.

5. The battery pack of claim 1, wherein the lead plate further comprises a second rib and a third rib and the second and third ribs are positioned on opposing sides of the extension region and are outwardly bent in a width direction of the battery cell.

6. The battery pack of claim 1, wherein the rib perpendicularly protrudes from the top surface of the extension region.

7. The battery pack of claim 1, wherein the lead plate further comprises a plurality of ribs protruding from the top surface of the extension region and have the same height.

8. The battery pack of claim 1, wherein an inner side of the extension region is welded onto the battery cell.

* * * * *